(12) United States Patent
Huber et al.

(10) Patent No.: US 11,175,460 B2
(45) Date of Patent: Nov. 16, 2021

(54) OPTICAL ROTARY TRANSMITTER

(71) Applicant: Spinner GmbH, Feldkirchen-Westerham (DE)

(72) Inventors: Rupert Huber, Schechen (DE); Reinhold Ringel, Kolbermoor (DE); Thomas Hannes Timo Huber, Bruckmühl (DE)

(73) Assignee: SPINNER GMBH, Feldkirchen-Westerham (DE)

( * ) Notice: Subject to any disclaimer, the term of this patent is extended or adjusted under 35 U.S.C. 154(b) by 0 days.

(21) Appl. No.: 17/052,768

(22) PCT Filed: Apr. 25, 2019

(86) PCT No.: PCT/EP2019/060619
§ 371 (c)(1),
(2) Date: Nov. 3, 2020

(87) PCT Pub. No.: WO2019/211161
PCT Pub. Date: Nov. 7, 2019

(65) Prior Publication Data
US 2021/0181428 A1 Jun. 17, 2021

(30) Foreign Application Priority Data
May 4, 2018 (DE) .................... 10 2018 206 894.1

(51) Int. Cl.
*G02B 6/36* (2006.01)
(52) U.S. Cl.
CPC ................... *G02B 6/3604* (2013.01)
(58) Field of Classification Search
CPC .................................................... G02B 6/3604
See application file for complete search history.

(56) References Cited

U.S. PATENT DOCUMENTS

| 4,641,915 A | 2/1987 | Asakawa et al. |
| 5,039,193 A | 8/1991 | Snow et al. |
| 2005/0036735 A1 | 2/2005 | Oosterhuis et al. |
| 2007/0217736 A1 | 9/2007 | Zhang et al. |
| 2009/0087303 A1 * | 4/2009 | Ruggiero ............... F01D 25/16 415/118 |

FOREIGN PATENT DOCUMENTS

| JP | S63267902 A | 11/1988 |
| WO | 01/25666 A1 | 4/2001 |
| WO | WO-2019119485 A1 * | 6/2019 ........... G02B 6/3826 |

OTHER PUBLICATIONS

International Search Report for PCT/EP2019/060619, dated Jun. 25, 2019; English translation submitted herewith (7 pgs.).

* cited by examiner

*Primary Examiner* — Omar R Rojas
(74) *Attorney, Agent, or Firm* — Fitch, Even, Tabin & Flannery LLP

(57) ABSTRACT

The invention describes an optical rotary transmitter with at least two housing parts, which are mounted so as to be rotatable relative to one another about an axis of rotation. An interior space is enclosed together with the at least two housing parts to be fluid impermeable manner by a membrane which completely encloses the interior space along one portion along the axis of rotation in a circumferential direction about the axis of rotation. The membrane is arranged so that at least portions of the surface of the membrane facing away from the interior space are accessible.

17 Claims, 2 Drawing Sheets

OPTICAL ROTARY TRANSMITTER

CROSS REFERENCE TO RELATED APPLICATIONS

REFERENCE IS MADE TO PCT/EP2019/060619 FILED Apr. 25, 2019, DESIGNATING THE UNITED STATES, WHICH CLAIMS PRIORITY TO GERMAN APPLICATION NO. 10 2018 206 894.1 FILED May 4, 2018, WHICH ARE INCORPORATED HEREIN BY REFERENCE IN THEIR ENTIRETY

BACKGROUND OF THE INVENTION

Field of the Invention

The invention relates to an optical rotary transmitter with at least two housing parts which are mounted so as to be rotatable relative to one another about a common axis of rotation and which directly and/or indirectly surround an interior space in a fluid-impermeable manner at least in regions, and at least two optical waveguides, each of which protrudes in a fluid-impermeable manner through a housing part and ends in the interior space with an optical collimator device on the respective end face thereof in such a manner that the optical collimator devices on the ends of the two optical waveguides delimit both sides of an intermediate gap which is orientated along the axis of rotation.

Description of the Prior Art

A species-related optical rotary transmitter comprising two housing parts that are mounted rotatably relative to each other and in which the end face of each waveguide carrying optical signals terminates, is disclosed for example in U.S. Pat. No. 4,641,915. An optical collimator device in the form of a graded index rod lens is mounted on the two opposing ends of the waveguides inside the housing parts for purposes of transmitting optical signals with the minimum possible losses. Several different design variants are disclosed, for example optical signal transmitters which each have waveguides that are aligned axially with the axis of rotation and axially and coaxially with the axis of rotation, wherein optically reflective elements are to be provided to transmit the light thereof. Optical collimator devices, which are each embodied as graded lenses, also enable an arrangement of the waveguides inside an optical rotary transmitter wherein the longitudinal extensions of the waveguides are each orientated at an angle to the axis of rotation and in each of the optical collimator devices allocated thereto, thus making it possible to avoid interfering back reflection effects at the boundary surfaces through selective decoupling.

Given the dramatic rate of increase in the volume of data that needs to be transmitted, many different application areas are now impossible to imagine without optical rotary transmitters, which are far superior to the conventional rotary transmitters based on electrical contact used widely in the past.

Particular requirements are defined for the functional capabilities of species-related optical rotary transmitters depending on the respective external environmental influences, such as mechanical, thermal, chemical, atmospheric or other environmental influences to which the optical rotary transmitter is exposed.

One particular field of application relates to underwater uses, particularly at great depths, where an optical rotary transmitter is exposed to immense pressure loads, which in principle range from 1 bar at sea level and increase depending on the depth of deployment at a rate of 1 bar/10 m water depth to a maximum of 1070 bar at the deepest point at the bottom of the *Mariana* Trench.

Moreover the absolute pressure loads associated with the respective deployment depth of an optical rotary transmitter, particularly for purposes of transmitting optical information for mobile submarine objects such as diving robots etc., the optical rotary transmitters may also be exposed to pressure fluctuations of several tens of bar within a very short period of time. Apart from the requirement for absolute impermeability of the housing parts which must still be able to rotate relative to one another in an optical rotary transmitter, deployment conditions of such kind place enormous demands on the mechanical stability of all optical components assembled inside the optical rotary transmitter.

Document WO 01/25666 A1 discloses an optical rotating coupling for the underwater and/or deep sea use, which provides a pressure equalizing barrier membrane for purposes of pressure balancing, the membrane being disposed inside a pressure equalization chamber to establish a pressure balance between the oil-filled interior chamber and the ambient pressure. Further optical rotating couplings with a fluid-filled interior space are also described in US published patent applications 2007/0217736 and 2005/0036735, and U.S. Pat. No. 5,039,193. In these cases, however, the sealing elements provided to equalize the pressure all move linearly.

SUMMARY OF THE INVENTION

The problem relating to the invention is to further develop an optical rotary transmitter with at least two housing parts which are mounted to be rotatable relative to one another about a common axis of rotation and which directly/indirectly surround an interior space in a fluid-impermeable manner at least in regions, and at least two optical waveguides which each protrude in a fluid-impermeable manner through a housing part and ends in the interior space with an optical collimator device on the respective end face thereof in such a manner that the optical collimator devices on the ends of the two optical waveguides delimit both sides of an intermediate gap which is orientated along the axis of rotation and through which the optical light transmission between the two waveguides takes place to provide a reliable, operationally secure operation of the optical rotary transmitter under high pressure load under water. In particular, it is important to implement measures to ensure that optical signals can be transmitted in a stable manner without errors despite the immense pressure differences acting on the housing parts due to the circumstances of their deployment. The optical rotary transmitter designed for underwater use should be capable of withstanding pressure loads of up to 1000 bar.

The optical rotary transmitter according to the invention is characterized with the interior space being enclosed together with the at least two housing parts in a fluid-impermeable manner by a membrane which completely encloses the interior space along one portion along the axis of rotation in the circumferential direction about the axis of rotation. The membrane is arranged such that at least portions of the surface of the membrane facing away from the interior space are freely accessible, and come into direct, free contact with the medium that surrounds the optical rotary transmitter, which is in the case of underwater use and unobstructed contact with water over the largest possible area. In this way, it is ensured that the ambient pressure conditions are transferred without delay, directly via the membrane to the interior space, which is preferably filled with a fluid.

The optical rotary transmitter is based on the realization that the pressure-induced loads on the optical rotary transmitter. Particularly the seals provide a fluid-impermeable closure between the two housing parts which are mounted so as to be rotatable relative but another can be minimized to provide an instantaneous, that is a direct pressure equalization between the fluid-filled interior space of the optical rotary transmitter and the ambient pressure. In this way, pressure-induced deformation forces inside both housing parts in which the optical waveguides with the optical collimator devices are attached to the ends thereof are reduced to a minimum, and preferably are completely eliminated, so that the optical signal transmission is not impaired in any way.

The structural design of the optical rotary transmitter according to the invention has the requirement of creating the at least one membrane provided for the purpose of pressure equalization with the largest possible surface area, and connecting it with at least one of the two housing parts.

In order to prevent deformation forces generated by the pressure equalization from being exerted on the two housing parts, the membrane is preferably of tubular construction in a single part which completely surrounds the axis of rotation. Consequently, the membrane is exposed to the ambient pressure evenly and symmetrically about the axis of rotation, and transfers the pressure to the fluid in the interior space of the optical rotary transmitter evenly about the axis of rotation.

The membrane is preferably manufactured from an elastomer in the form of a hollow cylindrical tubular section which is arranged on one of the at least two housing parts. In order to create a fluid-impermeable connection between the tubular membrane and at least one of the two housing parts, each of the circular ends of the membrane tube sections is connected in fluid-impermeable manner to one of the two housing parts by means of a circular or annular form-locking connector which is preloaded with a pressing force. The complete ring closure on each pressing force preloaded form-locking connector on the two ends of the tubular section with one of the two housing parts also has the effect of distributing the deformation forces induced by the pressure equalization and acting on the membrane evenly over the housing parts that are immediately adjacent to the membrane. Therefore if any mechanical loads at all are transferred from the membrane to the housing parts they will be negligibly small.

In one variant of the optical rotary transmitter, the membrane is at a maximum radial distance from the axis of rotation that is less than a maximum radial distance between the at least two housing parts and the axis of rotation. At the same time at least a region of one housing part also protrudes beyond at least a portion of the membrane in the axial extension of the membrane radially outside towards the membrane. In this way, a mechanical protection of the membrane from external mechanical influences is assured.

As an alternative to the production of the membrane manufactured from an elastomer material which represents a component that is separate from the housing part, it is expedient to construct the membrane integrally with the housing part, that is from the same material as the housing part, for example from metal. In this case, the membrane is given a wall thickness that is sufficiently thin to allow an elastic deformability. A kind of flexure bearing, preferably in the form of a film hinge, further functions as a transition between membrane and housing part, particularly to guarantee that the membrane remains radially movable relative to the housing part.

The embodiment of the membrane in the form of a component connected as a single part with one of the two housing parts may be produced particularly advantageously as part of a generative manufacturing process. Various generative manufacturing processes may be considered depending on the material chosen for creating the housing part, preferably both housing parts. In the case that the housing parts are made from a metallic material, laser sintering processes are suitable, in the case that both housing parts are made from a plastic material, layered generative manufacturing processes of the fused deposition modelling type—FDM for short—may be implemented.

The interior space of the optical rotary transmitter which is filled with a fluid for the purpose of absorbing pressure is preferably filled with a fluid which is transparent in the optical or near infrared spectral range, for example an aqueous solution, water, oil, hydraulic fluid or silicone oil. There are no particular requirements with regard to the optical refractive index.

In order to reduce losses of light across the fluid-filled intermediate gap during the transmission of light along the waveguides, it is recommended on the one hand to construct the intermediate gap as small as possible, and to position the opposing collimator end faces so that they are not parallel to each other. The end face normals associated with the collimator end faces intersect at an angle $\alpha \neq 0$. In a particularly suitable variation of the rotary transmitter, the end face normals of the optical collimator devices, which are preferably embodied as graded index lenses, are each orientated at an angle to the axis of rotation.

BRIEF DESCRIPTION OF THE DRAWINGS

In the following section, the invention will be described for exemplary purposes using exemplary embodiments thereof and with reference to the drawings, without general limitation of the invention. In the drawing.

WAYS TO IMPLEMENT THE INVENTION, COMMERCIAL APPLICABILITY

Figure 1A:
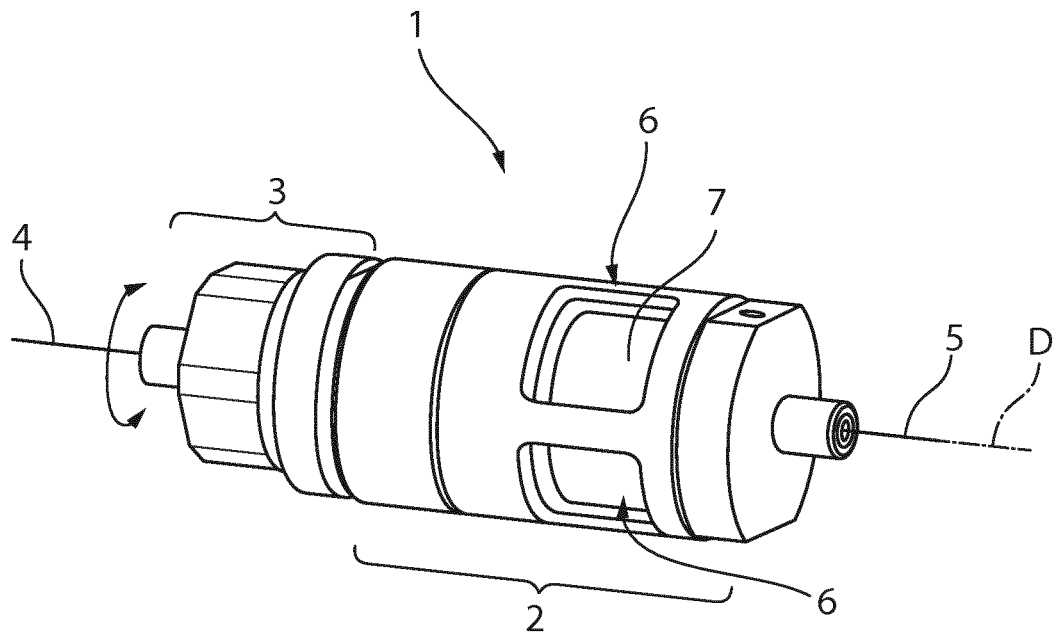
FIGS. 1a, b shows an external view of two optical rotating couplings.

FIG. 1a represents a perspective external view of an optical rotary transmitter 1 constructed according to the invention with one housing part 2 embodied as a stator and one housing part 3 embodied as a rotor, which is mounted so as to be rotatable relative to an axis of rotation D that passes through both housing parts 2, 3. One waveguide 4, 5, along which optical signals are transmitted by the optical rotary transmitter 1, runs into each of the two housing parts 2, 3.

The housing part 2, which serves as the stator is furnished with window-like recesses 6, to which a flexible membrane 7 is attached radially inwardly and which radially completely surrounds the axis of rotation D and is connected in fluid-impermeable manner axially to both sides of the housing part 2. Preferably the connection is in the form of a force preloaded form-locking connector. The housing parts 2 and 3 together with the membrane 7 attached to the housing part 2 close off an interior space I in fluid-impermeable manner. See the longitudinal cross section view of FIG. 2, inside which the ends of both waveguides 4, 5 are mounted adjacent to each other for purposes of optical signal transmission.

The large opening width of the window-like recesses 6 enables the flexible membrane 7 constructed in the form of a hollow cylindrical tubular section to be accessed without obstruction from the immediate surroundings of the optical rotary transmitter 1, so that the ambient pressure conditions are able to act on the entire outer shell surface of the flexible membrane 5. This design characteristic enables the optical rotary transmitter to be used under water, even at extreme depths and in conditions of dynamically changing ambient pressures that occur with mobile submarine objects, for example during deployment of underwater robots as a result of variable diving depths.

Figure 1B:
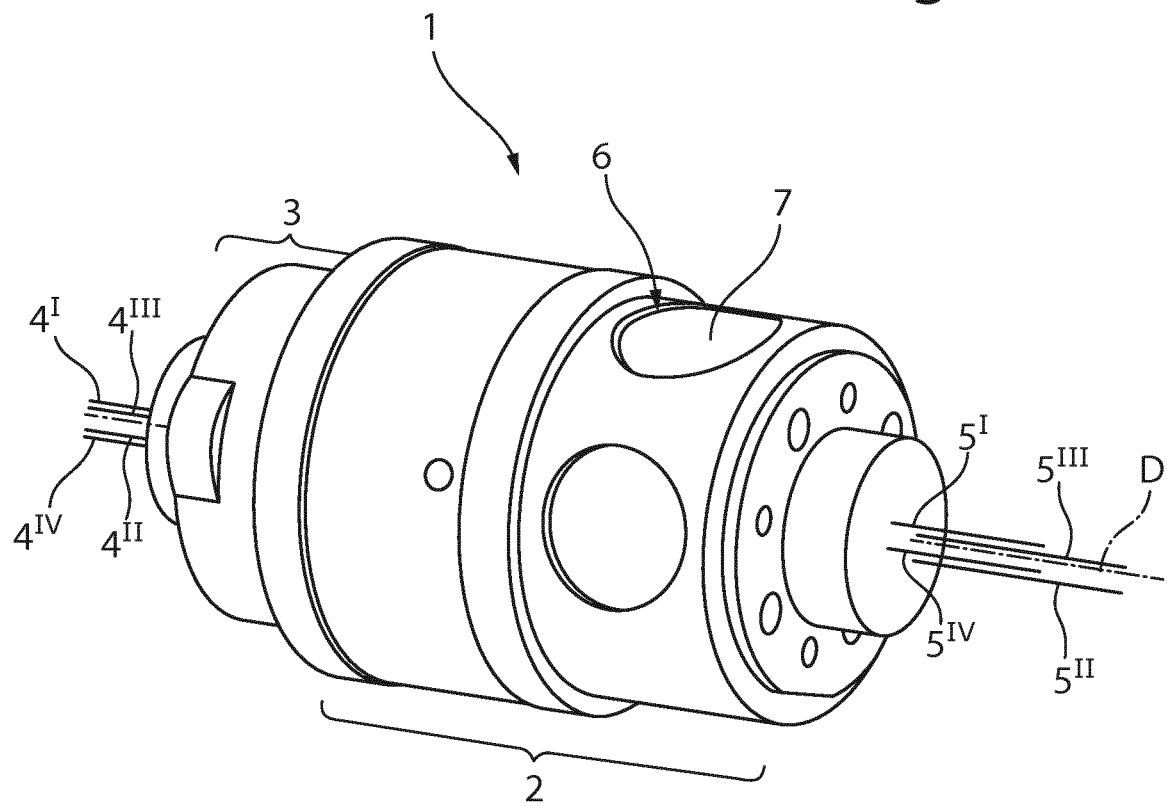

FIG. 1*b* shows an alternative construction variant for producing an optical rotary transmitter 1 which is designed for submarine use and provides one stationary housing part 2 and one housing part 3 which rotates relative thereto. In the case of FIG. 1*b* as well, a tubular membrane 7, which completely surrounds the axis of rotation D in the circumferential direction, is connected to the housing part 2 in fluid-impermeable manner for the purpose of equalising the pressure at the stationary housing part 2. Housing part 2 is mounted immovably and is furnished with circular window openings 6 arranged evenly in the circumferential direction about the membrane 7, with the result that membrane 7 is completely surrounded fully accessible to the surrounding medium in the circumferential direction about the axis of rotation D. That is in the case of underwater deployment it is surrounded uniformly by water. Unlike the optical rotary transmitter 1 illustrated in FIG. 1*a*, which only couples a pair of waveguides 4, 5 to each other, which are arranged along the axis of rotation D, the optical rotary transmitter illustrated in FIG. 1*b* enables optical coupling between four individual optical waveguide pairs, $5^I/4^I$, $5^{II}/4^{II}$, $5^{III}/4^{III}$, $5^{IV}/4^{IV}$.

Figure 2:
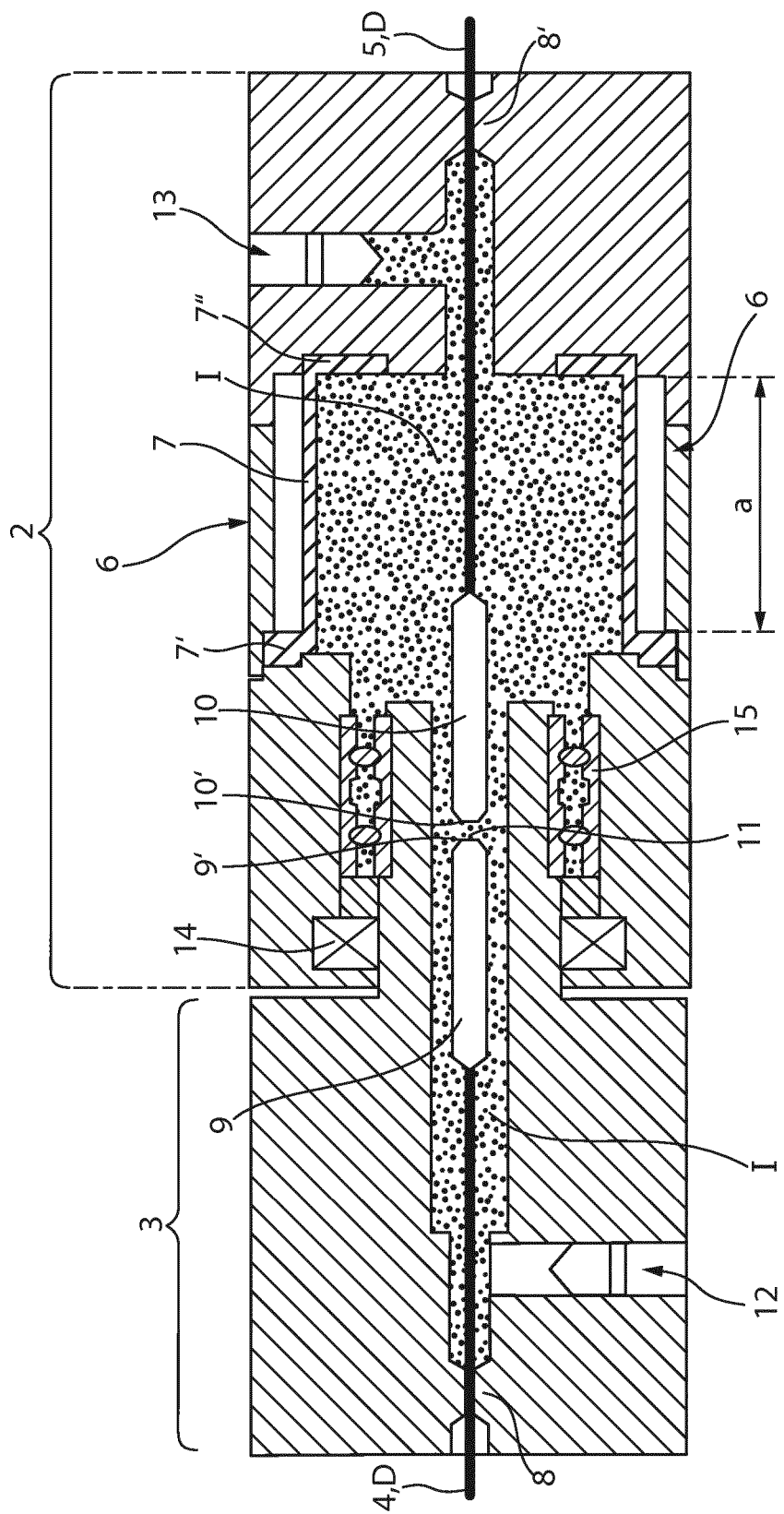
FIG. 2 is a longitudinal cross section through an optical rotating coupling designed according to the invention.

FIG. 2 shows a schematic longitudinal cross section through an optical rotary transmitter 1 designed according to the invention for the optical coupling of two waveguides 4, 5 which are mounted to be rotatable relative to one another. The waveguide 4 passes through a fluid-impermeable fiber seal 8 and runs into the rotatably mounted housing part 3, and has an optical collimator device 9 on its end face, which system is connected to the waveguide 4 in a fixed manner which is resistant to pressure, for example by a welded connection.

In the same way, the waveguide 5 passes through a fluid-impermeable fiber seal 8' and terminates in the interior space of the immovably mounted housing part 2. The end of the housing part also has an optical collimator device 10 attached fixedly and is resistant to pressure. The two optical collimator devices 9, 10 delimit an intermediate gap 11 with their collimator end faces 9', 10', which gap assures a frictionless or low-friction bearing of the two opposing collimator end faces 9', 10', which are rotatable relative to each other.

Both waveguides 4, 5 together with their optical collimator devices protrude into an interior space I, which is surrounded in a fluid-impermeable manner by both housing parts 2, 3 and by an elastically deformable membrane 7 which is connected in fluid-impermeable manner to the immovably mounted housing part 2. The elastic membrane 7 is manufactured from an elastomer material in the form of a tubular section and encloses the interior space I completely along an axial section a about the axis of rotation D. This ensures that the interior space I is sealed off from the surrounding medium in fluid-impermeable manner. The interior space I is also filled with a non-compressible fluid, preferably water, an aqueous solution, oil, particularly hydraulic oil or silicone oil, wherein the fluid is chosen to be transparent for light wavelengths preferably from the optical or infrared spectral range, which corresponds to the light that is to be transmitted via the waveguides 4, 5.

In order to fill the interior space I with the fluid, at least two filling apertures 12, 13 which can be closed off in fluid-impermeable manner are created in the two housing parts 2, 3. In order to assure fluid sealing of the two housing parts 2, 3 which are mounted rotatably relative to one another, in the embodiment shown an immobile rotary seal 14 is used, having a sealing O-ring and a raceway on the outer sides of a housing component of the rotatably mounted housing part 3. In addition, a pivot bearing 15 ensures substantially lossless relative rotatability of the two housing parts 2, 3.

A force preloaded form-locking connector conformed between the membrane 7 and the stationary housing part 2, which extends completely about the axis of rotation in circular and/or annular fashion on the two axially opposite ends of the tubular membrane 7 is used for fluid-impermeable sealing of the interior space I in the region of the membrane 7, which has the form of a tubular section of an elastomer material. Based on the shape or material chosen for the membrane 7, it is elastically deformable radially to the axis of rotation D, so that the ambient pressure prevailing in the environment surrounding the optical rotary transmitter bears evenly on the entire surface of the cylindrical outer shell surface of the membrane 7. For this purpose, window-like recesses 6 are created in the stationary housing part, see also FIG. 1*a*. In order to protect the membrane from external mechanical influences, the membrane 7 is arranged radial inwardly with respect to the radially outer surface of the stationary housing part 2.

The housing parts 2, 3 are manufactured from mechanically robust, substantially chemically inert material, preferably stainless steel, and form a component which is resilient to external mechanical influences. As an alternative to the creation of the membrane 7 in the form of a tubular section manufactured from an elastomer material, it is also conceivable to construct the membrane 7 integrally with the housing part that is mounted immovable, that is from the same material as the housing part. For this purpose, generative manufacturing processes may be considered. To provide an elastic bearing for a membrane 7 which is manufactured integrally with the housing part 2 in this way, the membrane is preferably connected to the housing part via an elastic flexure bearing.

The other components shown in FIG. 2 serve to minimize the friction as far as possible in the bearing of the two housing parts 2, 3 which are mounted rotatably relative to each other and are not central to the present invention.

In order to reduce or entirely avoid interfering back reflection losses during the transmission of optical signals between the two collimator end faces, the optical collimator devices 9, 10 are preferably arranged relative to one another in such manner that their end face normals associated with the respective collimator end faces form an angle $\alpha \neq 0$, i.e. they are not orientated plane-parallel to each other. A particularly advantageous arrangement of the at least two optical collimator devices constitutes an arrangement in which the surface normals of the two collimator end faces are each orientated at an angle to the axis of rotation D.

LIST OF REFERENCE SIGNS

1 Optical rotary transmitter
2 Fixedly mounted housing

3 Rotatably mounted housing
4, 5 Waveguides
$4^I$, $4^{II}$, $4^{III}$, $4^{IV}$ Waveguides
$5^I$, $5^{II}$, $5^{III}$, $5^{IV}$ Waveguides
6 Window recess
7 Membrane
7', 7" Axial ends of the membrane
8, 8' Fluid-impermeable fiber seal
9, 10 Optical collimator device
9', 10' Collimator end face
11 Intermediate gap
12, 13 Filling mechanism
14 Rotary seal
15 Pivot bearing
D Axis of rotation
a Axial portion
I Interior space

The invention claimed is:

1. An optical rotary transmitter comprising:
at least two housing parts, which are mounted relative to one another about a common axis of rotation and which surround an interior space to be fluid-impermeable at least in regions, and at least two optical waveguides which each protrude to be fluid-impermeable through the housing parts and each end in an interior space with an optical collimator on a respective end face so that the optical collimators on the ends of the two optical waveguides delimit both sides of an intermediate gap which is orientated along the axis of rotation;
the interior space is enclosed with the at least two housing parts to be fluid-impermeable by a membrane, completely enclosing the interior space along at least one portion along the axis of rotation in a circumferential direction about the axis of rotation; and
the membrane includes at least portions of the surface of the membrane facing away from the interior space which are accessible.

2. An optical rotary transmitter according to claim 1, wherein:
the interior space is filled with a fluid which is transparent in an optical or near infrared wavelength spectrum.

3. An optical rotary transmitter according to claim 2, wherein:
the fluid is one of the following fluids: aqueous solution, water, oil, hydraulic fluid, silicone oil.

4. An optical rotary transmitter according to claim 2, wherein:
the membrane is an elastomer, is tubular and arranged on one of the at least two housing parts and forms a connection that seals the interior space by a pressing force preloaded by a form-locking connector.

5. An optical rotary transmitter according to claim 3, wherein:
the membrane is an elastomer, is tubular and arranged on one of the at least two housing parts and forms a connection that seals the interior space by a pressing force preloaded by a form-locking connector.

6. An optical rotary transmitter according to claim 2, wherein:
the membrane is connected to one of the at least two housing parts via at least one film hinge.

7. An optical rotary transmitter according to claim 3, wherein:
the membrane is connected to one of the at least two housing parts via at least one film hinge.

8. An optical rotary transmitter according to claim 4, wherein:
the membrane is connected to one of the at least two housing parts via at least one film hinge.

9. An optical rotary transmitter according to claim 2, wherein:
the membrane has a maximum radial distance from the axis of rotation which is less than a maximum radial distance between the at least two housing parts and the axis of rotation, and at least a portion of one of the housing parts protrudes beyond at least a partial area of the membrane in the axial extension of the membrane radially outside towards the membrane.

10. An optical rotary transmitter according to claim 3, wherein:
the membrane has a maximum radial distance from the axis of rotation which is less than a maximum radial distance between the at least two housing parts and the axis of rotation, and at least a portion of one of the housing parts protrudes beyond at least a partial area of the membrane in an axial extension of the membrane radially outside toward the membrane.

11. An optical rotary transmitter according to claim 4, wherein:
the membrane has a maximum radial distance from the axis of rotation which is less than a maximum radial distance between the at least two housing parts and the axis of rotation, and at least a portion of one of the housing parts protrudes beyond at least a partial area of the membrane in an axial extension of the membrane radially outside toward the membrane.

12. An optical rotary transmitter according to claim 6, wherein:
the membrane has a maximum radial distance from the axis of rotation which is less than a maximum radial distance between the at least two housing parts and the axis of rotation, and at least a portion of one of the housing parts protrudes beyond at least a partial area of the membrane in an axial extension of the membrane radially outside toward the membrane.

13. An optical rotary transmitter according to claim 2, wherein:
one of the housing parts are immobile relative to other of the housing parts and at least portions of one of the housing parts are surrounded radially by another of the housing parts, and the membrane is attached to one of the housing parts to be fluid-impermeable.

14. An optical rotary transmitter according to claim 2, wherein:
the optical collimators are connected to the waveguides and each collimator end face, delimits one side of an intermediate gap with an end face normal, and the optical collimators are arranged in such manner that end face normals thereof intersect each other at an angle α which is not equal to 0°.

15. An optical rotary transmitter according to claim 14, wherein:
at least one of the optical collimators is disposed with the end face normal orientated at an angle to the axis of rotation.

16. An optical rotary transmitter according to claim 2, wherein:
at least one of the optical collimators is a graded index lens.

17. An optical rotary transmitter according to claim 2, wherein:
the optical collimators are each attached to the end faces of the waveguides fixedly to be resistant to pressure.

* * * * *